United States Patent
Supinski et al.

(10) Patent No.: US 7,162,722 B1
(45) Date of Patent: Jan. 9, 2007

(54) SYSTEMS AND METHODS FOR INTEGRATING A PLURALITY OF COMPUTER RESOURCES

(75) Inventors: Robert Supinski, Suffield, CT (US); Michael R. Austin, Palmer, MA (US); Gary Desrosiers, Enfield, CT (US); Jiancai He, Windsor, CT (US); John Kunz, Springfield, MA (US); Will Tan, Belchertown, MA (US); Rickey C. Tang, Southwick, MA (US); David Thomas, Vernon, CT (US)

(73) Assignee: Massachusetts Mutual Life Insurance Company A MassMutual Financial Group, Springfield, MA (US)

( * ) Notice: Subject to any disclaimer, the term of this patent is extended or adjusted under 35 U.S.C. 154(b) by 606 days.

(21) Appl. No.: 10/306,401

(22) Filed: Nov. 27, 2002

(51) Int. Cl.
G06F 13/00 (2006.01)
(52) U.S. Cl. ...................... 719/310; 719/316
(58) Field of Classification Search ................ 718/106; 709/201, 217, 227, 229; 719/310, 315, 316, 719/328; 707/100, 104.1
See application file for complete search history.

(56) References Cited

U.S. PATENT DOCUMENTS

| | | | |
|---|---|---|---|
| 5,627,972 A | 5/1997 | Shear | |
| 5,787,437 A | 7/1998 | Potterveld et al. | |
| 6,041,362 A | 3/2000 | Mears et al. | |
| 6,219,675 B1 * | 4/2001 | Pal et al. | 707/201 |
| 6,256,676 B1 | 7/2001 | Taylor et al. | |
| 6,779,184 B1 * | 8/2004 | Puri et al. | 719/315 |
| 6,912,522 B1 * | 6/2005 | Edgar | 707/2 |
| 2002/0026630 A1 | 2/2002 | Schmidt et al. | |
| 2002/0111820 A1 | 8/2002 | Massey | |
| 2004/0054675 A1 * | 3/2004 | Li | 707/100 |

* cited by examiner

Primary Examiner—William Thomson
Assistant Examiner—Andy Ho
(74) Attorney, Agent, or Firm—Mintz Levin Cohn Ferris Glovsky and Popeo, P.C.

(57) ABSTRACT

One embodiment of the invention provides a method for integrating a plurality of computer applications. The method includes receiving from a requestor a request of a target application. The request includes data identifying a target application and a target application service requested by the requestor. An abstraction layer receives the request. The method further includes using a Profile Manager in communication with the abstraction layer to receive data identifying the target application, to select a sack (a portable container for the request, e.g., a serialized object) and to select which of a plurality of sack content providers (SCPs) to use to interface with an appropriate element given the target application. The plurality of SCPs are in communication with the abstraction layer. The plurality of SCPs interface with a plurality of elements including at least a first application and at least a first hub.

18 Claims, 7 Drawing Sheets

SYSTEMS AND METHODS FOR INTEGRATING A PLURALITY OF COMPUTER RESOURCES

BACKGROUND OF THE INVENTION

The present invention relates to integrating a plurality of computer resources, e.g., applications and databases, and, more particularly, to the sharing of data and business processes among connected data applications and data sources regardless of technology or location.

One can refer to the sharing of data and business processes among connected applications and data sources in an enterprise (and sometimes with outside organizations with relationships to the enterprise) as enterprise application integration (EAI). EAI is a business computing term for the plans, methods, and tools aimed at modernizing, consolidating, and coordinating the computer applications in an enterprise. Typically, an enterprise has existing legacy applications and databases and wants to continue to use them while adding or migrating to a new set of applications that exploit the Internet, e-commerce, extranet, and other new technologies.

Interest in EAI is driven by a number of factors including the recent rapid expansion in Internet use, the increase in client/server computing, and corporate mergers and acquisitions. To fully appreciate the scope of the EAI problem, consider a typical large enterprise. Such an enterprise may have more than one platform type such as OS/390, Unix and Windows. The same enterprise may have several dominant technologies such as J2EE, MS/COM, CICS, and batch and may utilize several dominant development environments such as Java, Visual Basic and COBOL. In addition, that same enterprise may use a number of different primary methods for one application to access another, such as RPC, Point-to-Point (P2P) messaging, Publish-and-Subscribe, and [possibly] Extract-Transform-Load (ETL). Thus, enterprises such as the typical large enterprise just described are forced to attempt to integrate computer resources in a highly heterogeneous environment.

EAI can involve developing a total view of an enterprise's business and its applications, seeing how existing applications fit into the view, and then devising ways to efficiently reuse what already exists while adding new applications and data.

EAI can encompass methodologies such as object-oriented programming, distributed, cross-platform program communication using message brokers with Common Object Request Broker Architecture and COM+, the modification of enterprise resource planning (ERP) to fit new objectives, enterprise-wide content and data distribution using common databases and data standards implemented with the Extensible Markup Language (XML), middleware, message queuing, and other approaches.

While EAI has many advantages, it can also have some drawbacks. If an enterprise programs to a vendor specific framework, in the event that the vendor goes out of business, or better technology becomes available, the enterprise may be left in an undesirable position and may have to transition to a new framework or support the old framework using internal resources. For example, if an enterprise adopts vendor specific middleware, the enterprise then becomes highly dependent on that vendor. Furthermore, if the selected middleware does not interface with a particular application, the enterprise typically must develop a custom solution in order to integrate that particular application. An example of middleware is provided by U.S. Pat. No. 6,256,676, issued to Taylor et al. and incorporated herein by reference in its entirety.

Thus, a need exists for systems and methods that: 1) allow integration of new computer resources into an enterprise on an as-needed basis; 2) are cost effective to adopt; and 3) allow integration while avoiding unnecessarily tying an enterprise to a particular technology. A need also exists for systems and methods that allow an enterprise to reduce the requirement for custom coding and that increase an enterprise's return on investment by leveraging its existing information technology investments and by reducing time to market.

SUMMARY OF THE INVENTION

The present invention relates to integrating a plurality of computer resources, e.g., applications and databases. One embodiment of the present invention provides an EAI framework as a thin client-side [the client typically being an application on a server] abstraction layer that uncouples the requestor or publisher of information from the target provider or subscriber. The EAI framework also uncouples the requester or publisher from the technology used to satisfy the request. The EAI framework is not a middleware technology. Rather it is an extension to the client and runs on the same platform with the client code.

Another embodiment of the invention provides a method for integrating a plurality of computer applications. The method includes receiving from a requestor a request of a target application. The request includes data identifying a target application and a target application service requested by the requester. An abstraction layer receives the request. The method further includes using a Profile Manager in communication with the abstraction layer to receive data identifying the target application, to select a sack (a portable container for the request, e.g., a serialized object) and to select which of a plurality of sack content providers (SCPs) to use to interface with an appropriate element given the target application. The plurality of SCPs are in communication with the abstraction layer. The plurality of SCPs interface with a plurality of elements including at least a first application and at least a first hub. Preferably, the abstraction layer and the Profile Manager are on the same platform as the requester.

The method can further include returning the selected sack to the requestor for populating by the requestor with data necessary for the requested service; and forwarding the populated sack with the request to the selected SCP to allow the SCP to attempt to satisfy the request.

Still another embodiment of the invention provides a system for integrating a plurality of computer applications. The system is located on a platform with a requestor. The system includes an abstraction layer, a plurality of sack content providers (SCPs) in communication with the abstraction layer and a Profile Manager in communication with the abstraction layer. The abstraction layer receives from the requestor a request of a target application. The request includes data identifying a target application and a target application service requested by the requester. The plurality of SCPs interface with a plurality of elements including at least a first application and at least a first hub. The Profile Manager receives data identifying a target application and selects which of the plurality of SCPs to use to interface with the appropriate element based on the data identifying the target application.

These and other aspects of the invention are evident in the drawings and description which follow.

BRIEF DESCRIPTION OF THE DRAWINGS

The foregoing and other objects and advantages of the invention will be apparent from the following description and apparent from the accompanying drawings.

DETAILED DESCRIPTION OF THE ILLUSTRATED EMBODIMENTS

Figure 1:
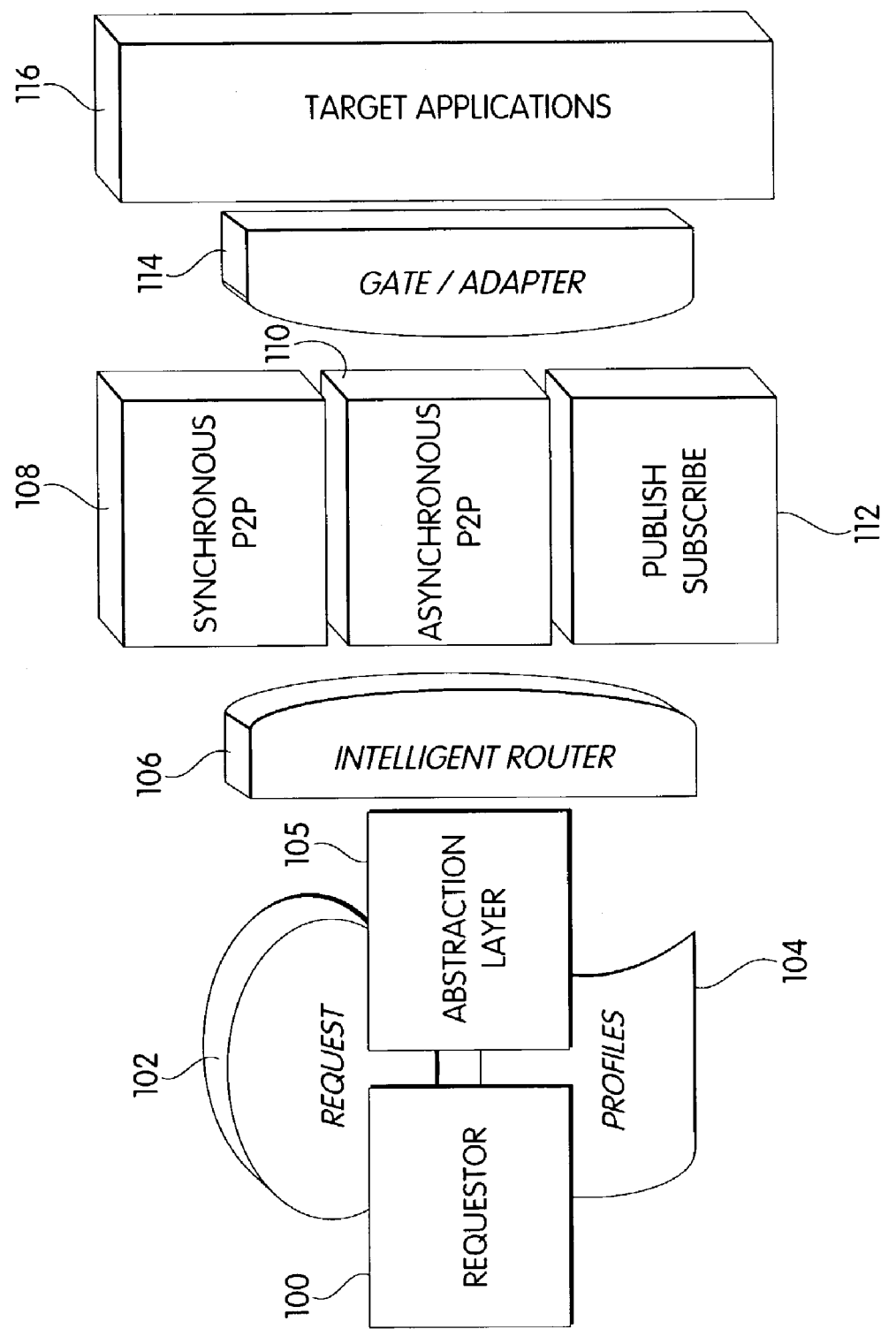
FIG. 1 shows a graphic of one embodiment of an EAI solution.

The present invention relates to integrating a plurality of computer resources, e.g., applications and databases. With reference to FIG. 1, one embodiment of an EAI solution according to the invention includes a requestor 100 interfacing with an abstraction layer 105. The abstraction layer is passed a request 102, namely what the application wishes to do, the information necessary to do it, and what type of answer is required [if any]. The profiles 104 contain enough information to allow the abstraction layer to choose the appropriate solution, namely a Synchronous 108 or Asynchronous Request-Acknowledge 110 or Request-Reply solution, or a Publish-and-Subscribe solution 112. The profiles can also dictate the form of that information request and answer, e.g., XML, or serialized object. The profiles give the abstraction layer enough information to effectively engage the solution [technology]. If requirements change or technology changes, the abstraction layer could choose an alternate route or technology based on information provided by the profiles 104. The illustrated embodiment further includes an intelligent router 106 for routing data to the appropriate target application 166. An adapter 114 adapts information that is exchanged between the requestor and the target application 116 via the abstraction layer 105. The adapter 114 attempts to adapt the information without loss of function.

Figure 2:
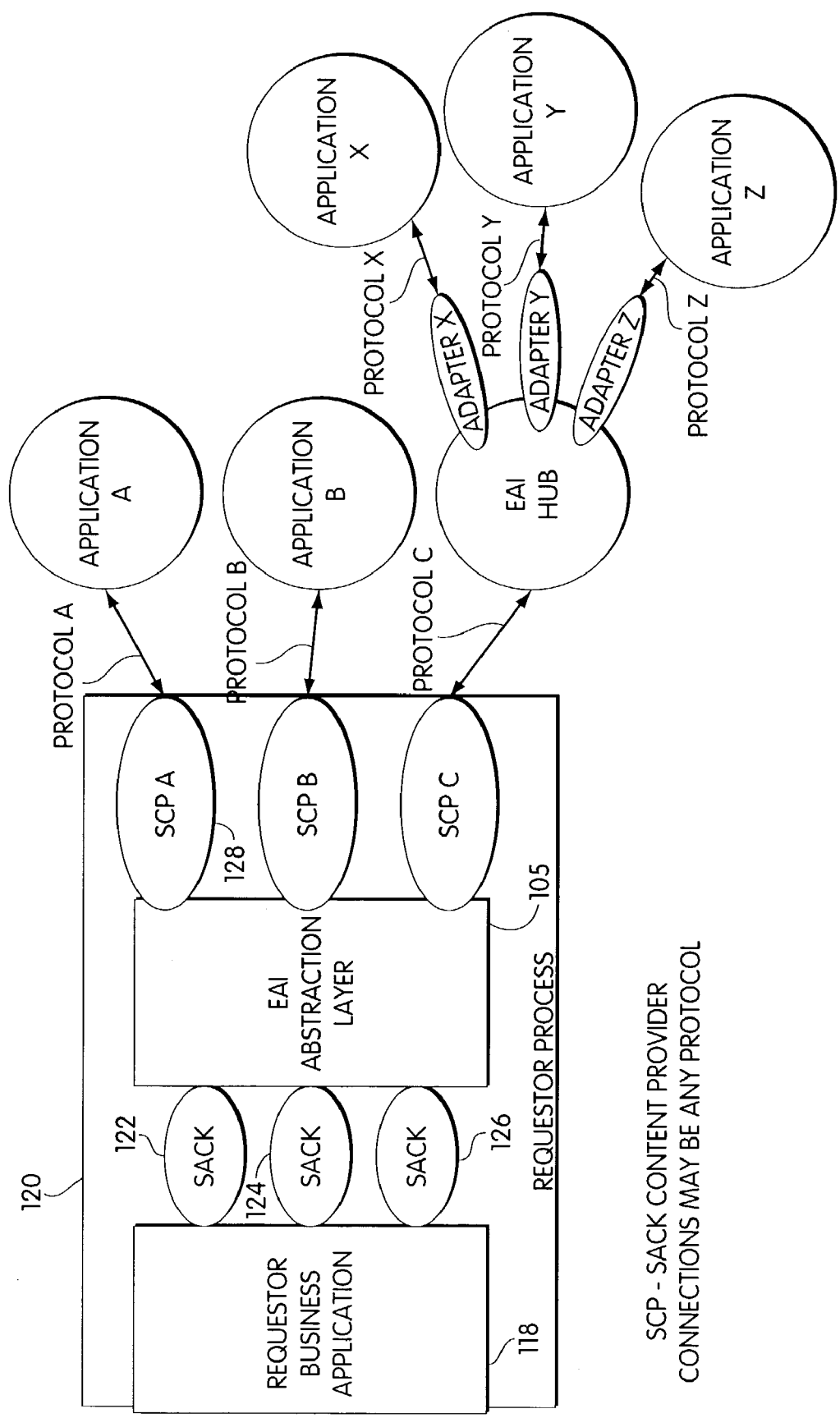
FIG. 2 is a graphical representation of one embodiment of an EAI framework consistent with the EAI solution of FIG. 1.

With reference to FIG. 2, one embodiment of an EAI framework consistent with the EAI solution of FIG. 1 includes a requestor process 120 interfacing with application A, application B, and an EAI hub using protocols A, B, and C, respectively. The EAI hub, in turn, interfaces with Applications X, Y, and Z using adapters X, Y, and Z, and protocols X, Y, and Z, respectively. This configuration is illustrative only and the invention contemplates the addition of other applications and hubs. Within the requestor process 120, a requester business application 118 interacts with an EAI abstraction layer 105 using sacks 122, 130, 132. The abstraction layer 105, in turn, interfaces with Application A, application B and an EAI hub using sack content provider (SCP) A, SCP B and SCP C, respectively.

A Sack 122 is a portable container for the request, response and/or publish data passed between the requester and [target] provider. The Sack greatly reduces the complexity of the EAI solution. The Sack may have a number of 'personalities': XML container, value object, complex object container providing navigation and business rules. One embodiment of a sack is capable of emitting XML. The Sack minimizes trips over the network when requesting services.

In one embodiment, the Sack is a serialized object that replaces request and response parameters passed to/from application code. All parameters passed in either direction are now contained within this object. This also allows for methods that act on those parameters to be invoked from either the requester or receiver of the sack. Stated differently, a Sack is a light Business Object. In this case the adjective light signifies that the business object can be easily transported over the network, may provide client-side processes or business rules, and acts as a proxy to the heavier server-side business object. Features of one embodiment of the Sack include:

It simplifies the retrieval of information

It can emit XML that represents its information content

It can contain embedded business rules [including editing]

It can have multiple personalities (e.g. request/reply vs. publish/subscribe)

It supports versioning.

In one embodiment, the Sack Content Provider (SCP) 128 is a plug-able technology used by the request. The SCP functions to populate the Sack 122. An SCP acts as an extension of [but invisible to] a requesting application, which allows different implementations to be plugged in without change to the requesting application. The SCP allows for point-to-point, information bus and/or hub-and-spoke technologies. In other words, SCPs allow for the most appropriate solution. The SCP does not inhibit the use of other technologies or frameworks.

Figure 3A:
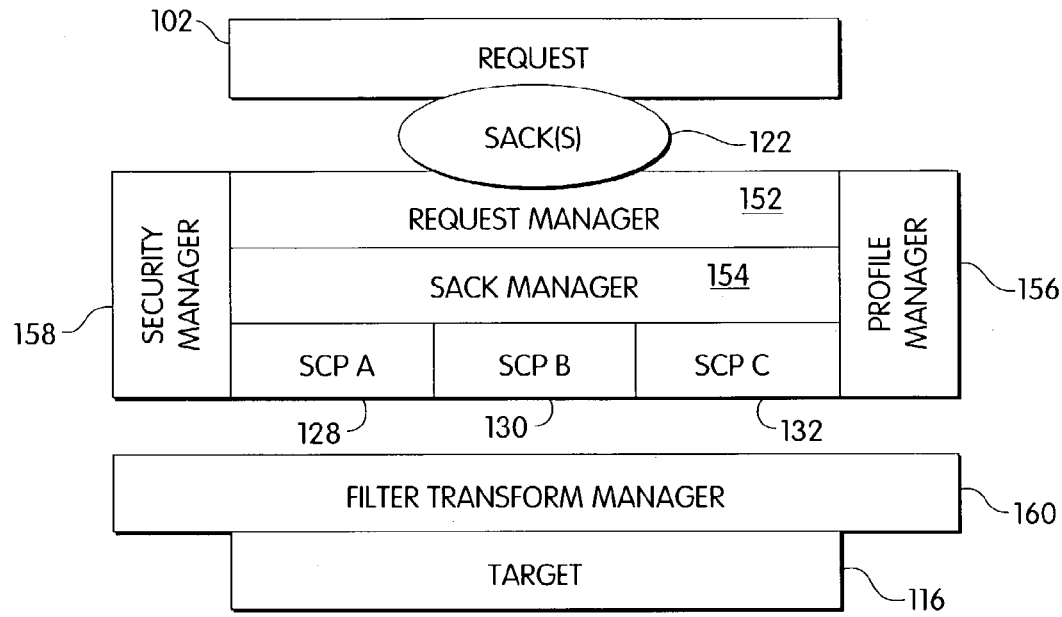
FIGS. 3A and 3B show the major components of the EAI framework of FIG. 2.
Figure 3B:
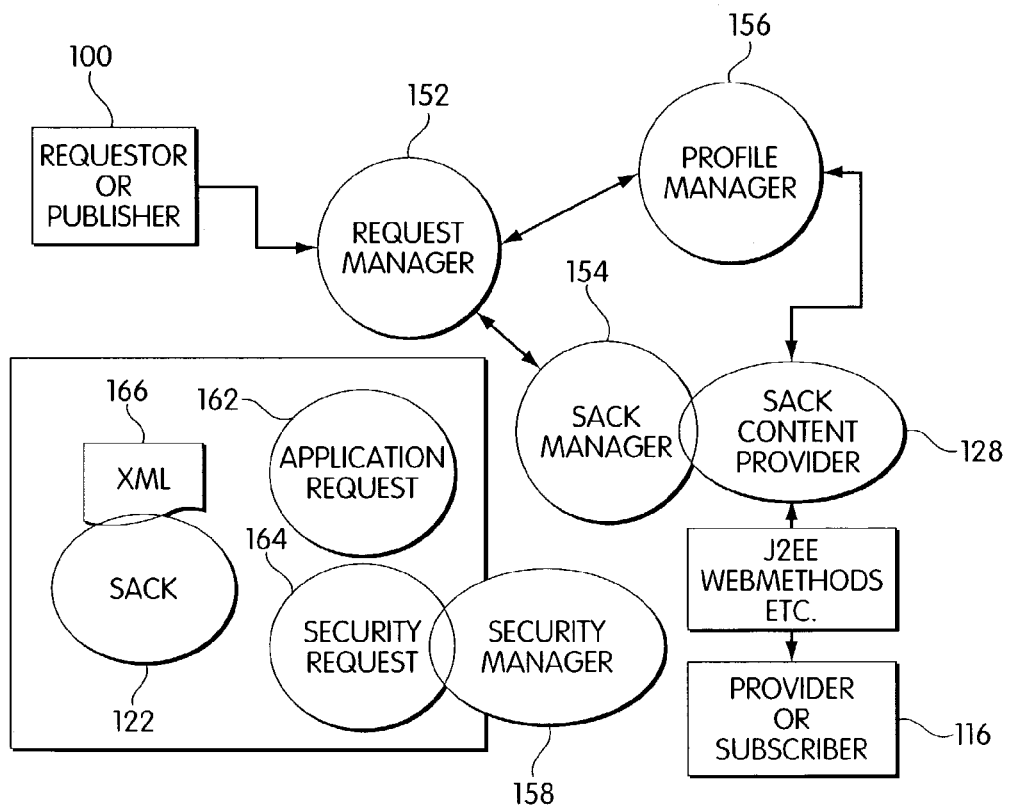

With reference to FIGS. 3A and 3B, the abstraction layer 105 includes a Request Manager 152 and a Profile Manager 156, a Sack Manager 154 and a security manager 158, each in communication with the Request Manager 152. The Profile Manager 156 provides the external information used by the EAI framework to bind the application request to the target service. It determines which Sack and SCP to use for a specific request. It has the ability to support rules to provide run-time flexibility. For instance, during the day one solution might be appropriate but a different solution might be preferred at night. The security manager 158 provides the security, auditing and logging services required by EAI requests.

With reference to FIG. 3A, in one embodiment, the Filter Transform Manager (FTM) is also a component of the EAI framework. The FTM pertains to the Sack and operates to eliminate, disguise or transform data for privacy or other reasons. The target service provider (e.g. a business application) could call this filter service before the sack is returned to the requester (the interface for the service is on the Security Request object). This invokes an EAI filter engine that performs the action required through a rule associated with an object. The object and/or rule can be at any level. For instance, if the entire sack is given to the filter engine, then every object in the sack is examined to see if a rule needs to be applied. When/if one is found then the appropriate rule(s) are invoked on that object.

Thus, the EAI Framework provides a level of abstraction for a requestor of services from another application such that the requestor doesn't need to know the technology used to communicate with the target application or the location of the service requested.

FIGS. 3A and 3B depict the major components of the framework. As noted, the three components that provide the flexibility and extensibility necessary are the Sack, Profile Manager and the Sack Content Provider. Each of these components can be either extended or replaced to solve any application-to-application request The only framework components 'visible' to a requesting [or publishing] application are:

EAIApplicationRequest Object 162—used to identify the requesting application and the specific request. It will be filled [by the framework] with additional information to allow the framework to create and deliver a Sack using an appropriate SackContentProvider.

EAISecurityRequest Object 164—used for [potential] security points throughout the framework and [possibly] used by the targeted Service.

EAISack Object 122—This object contains any information needed by the target service. The remaining portion of the Sack is populated by the target service providing the requester 'the answer'. The Sack may also contain a 'publish' request. A Sack may contain programmed intelligence, for instance, programmed intelligence for enforcing business rules. One embodiment of a Sack provides the ability to emit XML 166 in addition to accessing attributes and objects.

EAIRequestManager 152—This service is the only framework service exposed to the requesting application. This service engages the rest of the framework to accomplish the application request. It is also a factory for the EAIApplicationRequest and EAISecurityRequest objects, and ultimately the EAISack.

EAISackContentProvider (SCP) 128—This component is not actually visible to the requesting application. However, in the event a SCP does not exist for a unique requirement, code may have to be written by the application to satisfy that unique requirement. This code defines an interface to be implemented by an appropriate applicationSackContentProvider [plug-in]. This code engages the target service provider to fill the sack. There are general Content Provider plug-ins shared by a number of requestors, or [as mentioned earlier] one may be written to satisfy a unique request.

Figure 4:
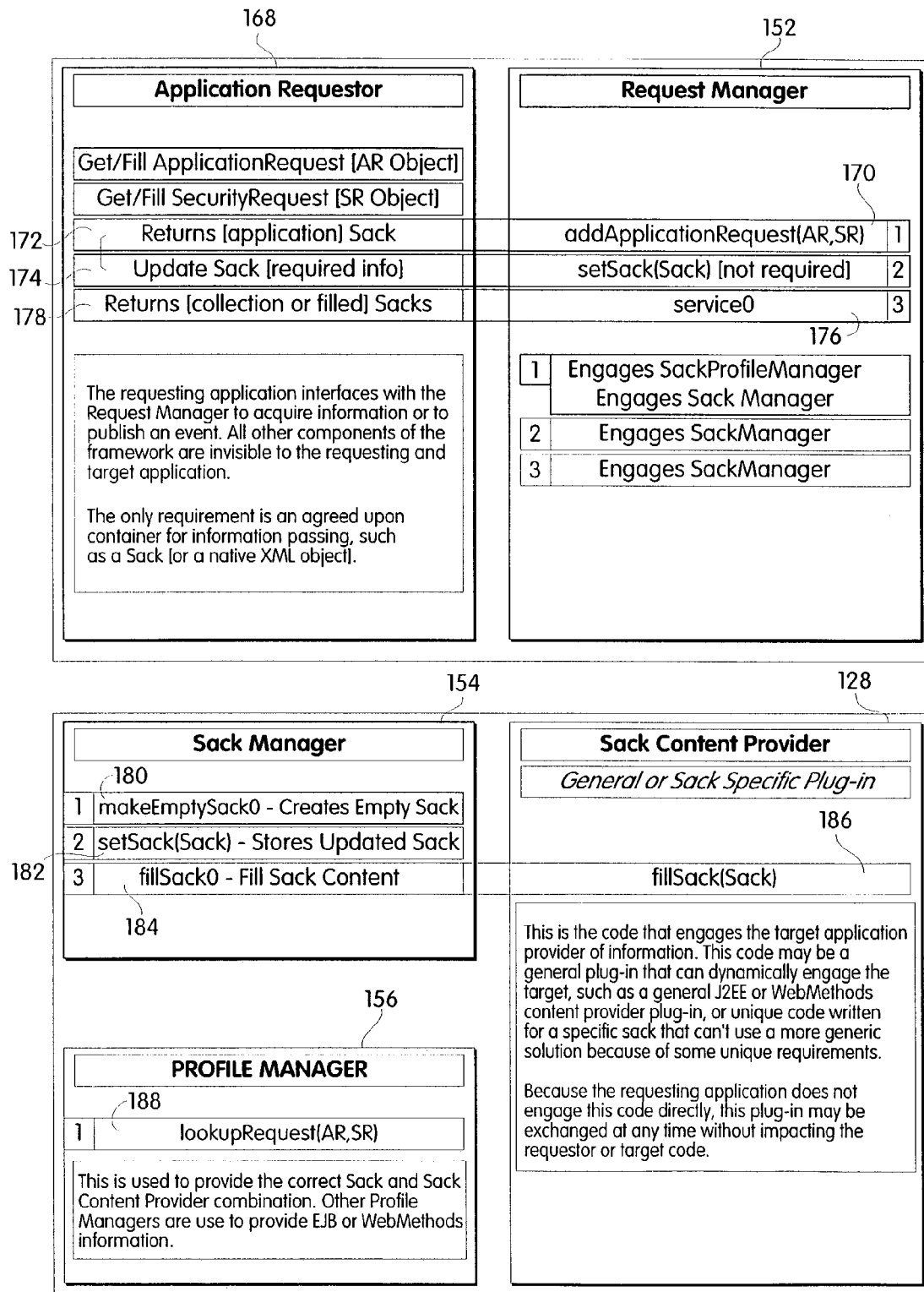
FIG. 4 is a high-level graphic depicting the flow of the EAI framework of FIG. 2.

With reference to FIGS. 3B and 4, one embodiment of the flow of the framework begins with the requester [of a remote service] engaging the EAIRequestManager 152. Using the Request Manager 152 as a factory, the requestor 100 acquires an Application Request object 162 and Security Request object 164. The requester 100 then provides profile and security information (EAIApplicationRequest, EAISecurityRequest) through the addApplicationRequest( ) method 170. The Request Manager 152 engages the Profile Manager 156 to perform a lookupRequest( ) 188 to determine the appropriate sack and sack content provider (SCP) to use. The Request Manager also engages the Sack Manager 154 to create 180 the appropriate sack.

The Request Manager 152 then returns the initialized [personalized] Sack 172. At this point the requestor [or publisher] 100 can provide 174 any information to the Sack needed by the target service. The requester 100 then invokes the service( ) method 176 on the EAIRequestManager 152, returning a [collection of] filled Sack(s) 178.

The Sack contains the information needed by the [requester] application. The requestor can 'consume' this information in one of two ways. Either the application has insight to the application specific methods provided by the Sack, or the application can make a request of the Sack to obtain an XML document.

A profile [directory] lookup [by the EAISackProfileManager 156] using the Application Profile mentioned above establishes the specific application Sack object. An application can choose to bypass the profile lookup and provide the necessary information directly to the EAIApplicationRequest object. When an application/requestor chooses to bypass the profile lookup, the requester must provide the necessary information to fulfill the request.

Turning now to the development of various Sacks, the requester and/or service team typically writes the individual Sacks required by the application since they are the owner of the target service and its associated data. The application specific sacks extend an abstract or base EAI framework generic Sack.

As noted above, an additional component important to the requester application is the applicationSackContentProvider. This component implements the EAISackContentProvider 128 interface having a single fillSack method 186. The profile lookup establishes this components name [unless the requestor supplies the name] and ultimately the EAISackManager 154 engages the appropriate SCP. The applicationSackContentProvider can be a generic component that satisfies the needs of many requesters, or it may be application specific code written by the requestor and/or service team.

Having described the operation of embodiments of a system according to the invention, the following is a description of one embodiment of a lifecycle of an EAI request for a request/reply pattern, e.g., where the requestor asks to receive all the claim history information about a specific family.

Request/Reply (for a Claim)

1. The requestor gets an 'instance' of the EAI Request Manager (using a factory method on the EAI Request Manager).

2. The requestor gets an instance of an EAI Application Request object from the EAI Request Manager. This object contains at a minimum the request type consisting of a three-part 'key'. The three-part key includes the requesting application name, the target application name (e.g., an application called Claim), and the target service name (e.g., a service called getClaimFamilyHistory). Note: these are logical names and not indicative of physical implementations. This object may be populated with other information to manage the workflow or behavior.

3. The requestor gets an instance of an EAI Security Request object from the EAI Request Manager. This object may be used to contain security information about the requestor (such as an identification number for the requestor). The Security Request object can additionally contain a number of services used by the framework (such as audit logging).

4. The requester adds a request to the EAI Request Manager by passing the EAI Application Request and Security Request objects. In return the requestor receives the appropriate application Sack [based on the request]. Note: steps 2–4 may be repeated to batch multiple requests, which may be executed sequentially or concurrently.

5. When the requestor adds a request to the Request Manager (step 4), the Request Manager engages multiple EAI components. The Request Manager invokes the Security Manager to ensure that the Security Manager authorizes the activity. During this process the Security Manager invokes the Profile Manager to retrieve an Access Control List (ACL), a list of source applications with access rights to the target application. The Request Manager also engages a Sack Manager that manages the request. Additionally, the Request Manager engages the Profile Manager to provide the appropriate application Sack and the appropriate Sack Content Provider (SCP) based on the target application name and/or the target service name.

6. The Request Manager returns the appropriate application Sack to the requester. The requestor then populates that portion of the Sack corresponding to the required request information. In this example this required information might by the social security number of the primary claimant member.

7. The requestor then invokes the service method at the EAI Request Manager to process the request(s).

8. The EAI Request Manager engages each EAI Sack Manager [created above] to fill the application Sack. As part of this process, the Sack Manager engages the Security Manager to ensure that the security manager authorizes the request. Audit logging may also occur at this point.

9. The EAI Sack Manager engages the appropriate SCP to satisfy the request, i.e., to fill the application sack with the reply [answer]. The Sack Manager passes the Sack, Application Request and Security Request objects to the SCP.

10. Most SCPs are general in nature but with a specific 'personality'. For instance, an enterprise java bean (EJB) SCP knows how to engage a [Java] EJB. In order to engage an EJB, an EJB SCP needs supplemental information, such as location of the EJB application server, the name of the EJB and the method name of the EJB to satisfy the request. The Profile Manager provides this supplemental information.

11. The SCP engages the target service, either directly or through a hub, normally passing it the Sack and the Security Request objects [passing the target service the Security Request objects is not a requirement]. The target service may also ask the Security Request object to audit log at this point and verify that the transaction is authorized.

12. The target service accesses whatever business code it requires, independent of the EAI framework. Typically the target service updates the Sack with the reply [answer].

13. The target service may engage the Security Request object to apply filtering rules against the Sack [e.g. privacy requirements]. It may also engage the Security Request object to audit log at this point.

14. The target service then returns the filled sack (in this example filled with claim history for the requested family) to the appropriate SCP.

15. The Sack flows through the Sack Manager to the Request Manager. The Sack manager and the Request Manger can perform additional audit logging.

16. The Request Manager then returns the filled Sack to the requester.

17. In this example, the [claim] application Sack is a complex container containing many objects and navigation code for easy access. For instance, using the Claim example, the Sack may contain methods like [boolean] nextClaim and gctNextClaim which could be used in a requester 'while' loop. In the present request/reply example, the requester made a single network request to acquire the Sack and the requestor can now make all [local] requests against the Sack.

Another pattern is a publish/subscribe pattern, e.g., where the requestor publishes an address change.

Publish/Subscribe (Address Change)

1. This pattern also begins with steps 1–10 outlined above. However, rather than filling the application Sack with a request, the requestor provides publication information (e.g. address change) instead.

2. Typically, in this scenario the appropriate SCP engages a message broker (e.g. WebMethods).

3. An EAI agent in the message broker handles any publication requests from the EAI framework. As a consequence, the message broker publishes the event, e.g., the publication information and the subscribers are independent from the EAI framework.

4. The message broker returns an acknowledgement (or failure) indication to the appropriate SCP.

5. The acknowledgment flows through the Sack Manager to the Request Manager and ultimately to the requestor.

Figure 5:
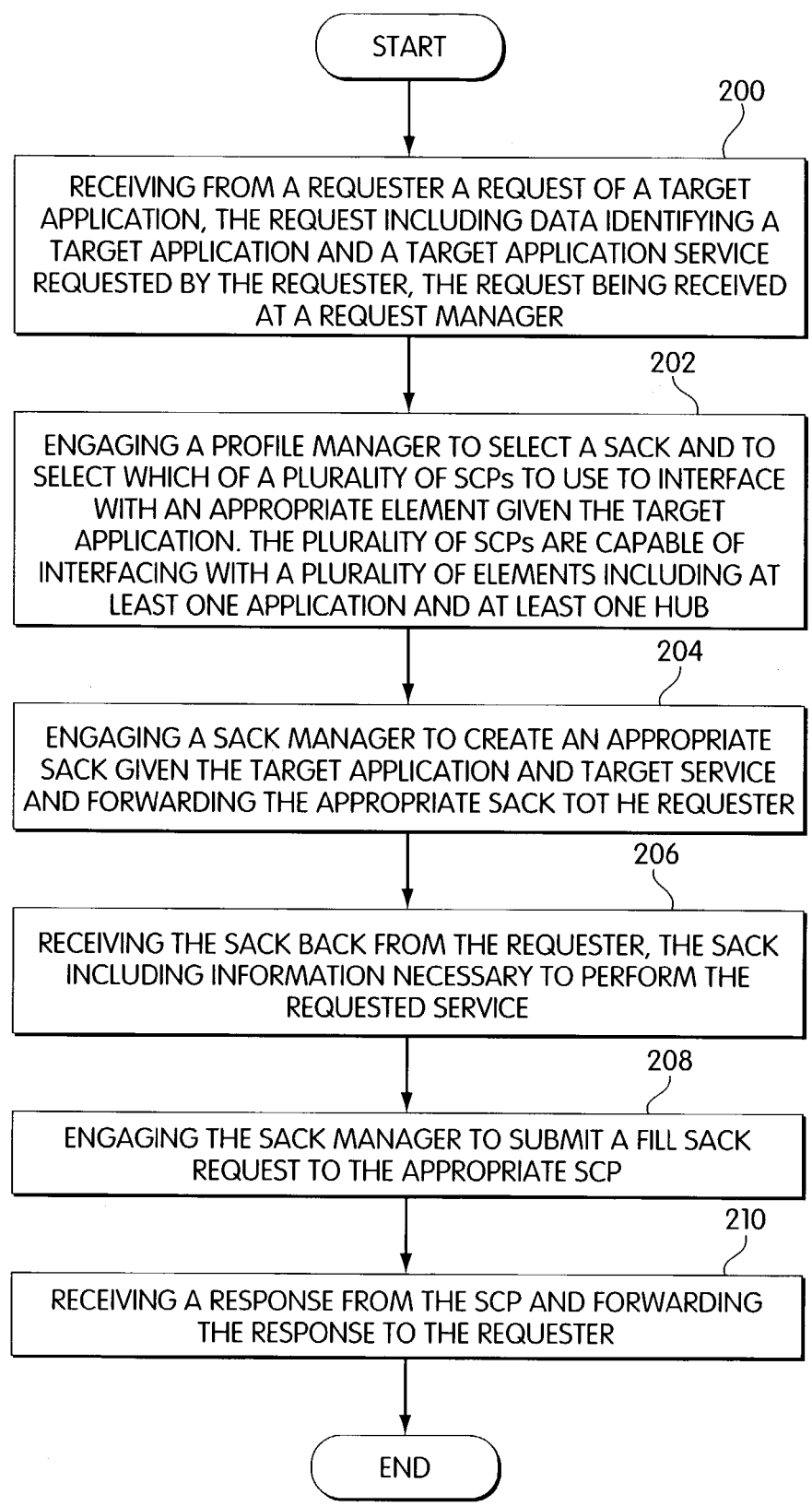
FIG. 5 is a flow chart for the operation of the EAI solution of FIG. 1.

With reference to FIG. 5, one embodiment of a method according to the invention begins with receiving 200 from a requester a request of a target application. The request includes data identifying a target application and a target application service requested by the requester. The Request Manager receives the request. The method then engages 202 a Profile Manager to select a sack and to select which of a plurality of SCPs to use to interface with an appropriate element given the target application. The plurality of SCPs are capable of interfacing with a plurality of elements including at least one application and at least one hub. The method then engages 204 a Sack Manager to create an appropriate sack given the target application and target service and forwards the appropriate sack to the requester. The method receives 206 the sack back from the requester, the application requestor object having obtained the information necessary to perform the requested service. The method then engages 208 the Sack Manager to submit a fill sack request to the appropriate SCP as determined by the Profile Manager. Finally, the method receives 210 a response from the SCP and forwards the response to the requester.

Figure 6:
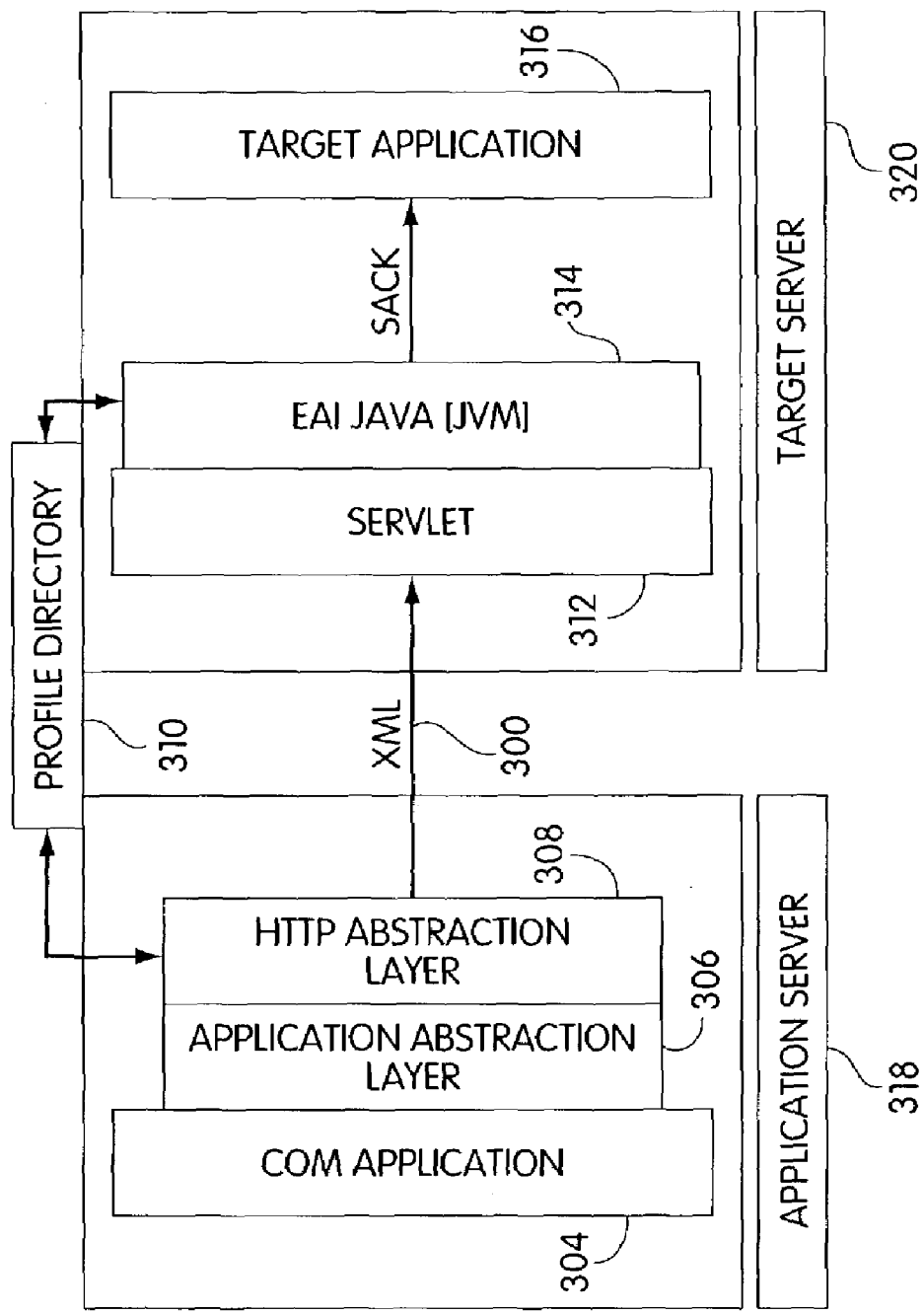
FIG. 6 is a graphical representation of one embodiment of a distributed application access from CICS and batch utilizing the EAI solution of FIG. 1.

With reference to FIG. 6, one embodiment of a COM EAI Framework includes a XML/HTTP bridge 300 accessing the existing EAI framework 312, embodiments of which are shown in FIGS. 2–3B.

In one embodiment, the COM abstraction layer 306 is a Visual Basic abstraction layer. In the COM case the information being passed between the application server 318 and the target server 320 is in the form of XML. There are two classifications of information needed in a request, System and Application information. These two classifications of information provide two implementation choices. The requesting application is accountable for supplying the appropriate XML [vocabulary and grammar] or some helper classes can be provided to create as much of the System XML as possible.

Ultimately an XML document containing both System and Application information is carried over the network, using HTTP to a waiting [generic] Servlet 312. In order to keep location independence from code, directory lookup is provided in the COM layer to provide the URL of the Servlet. The HTTP abstraction layer 308 can provide this service.

One can provide specific or general architecture for the Servlet 312. One can provide a unique Servlet for each transaction type. Such a Servlet is hard-coded to engage the target directly. Such a hard-coded Servlet is very much like a proprietary Sack Content Provider in the EAI framework of FIGS. 2–3B.

Alternatively, one can use a generic Servlet, which engages the existing EAI framework of FIGS. 2–3B. Using the information in the System structures in the XML document, the Servlet 312 engages the EAI framework 314 acting as a requester. If the XML document is constructed with the framework in mind, this Servlet can use the setRequestFromXML method on the target application Sack to populate the sack. After engaging the target application through the EAI framework, it can transform the returned target application Sack into XML using getContentAsXML. It then returns the XML through the HTTP abstraction layer 308 as above.

Figure 7:
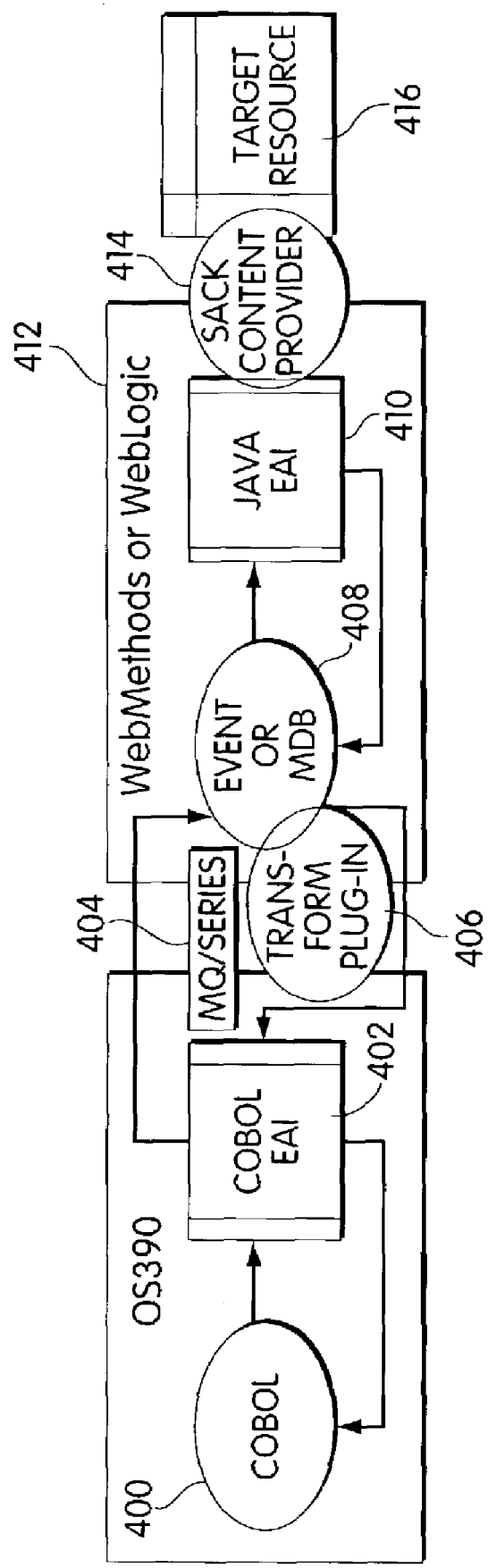
FIG. 7 is a graphical representation of one embodiment of a COM EAI abstract layer framework utilizing the EAI solution of FIG. 1.

With reference to FIG. 7, one embodiment of a framework for accessing a distributed application from Customer Information Control System (CICS) or batch includes the following. The COmmon Business Oriented Language (COBOL) is a high-level programming language for business data processing. A COBOL program 400 [CICS or batch] engages the COBOL EAI framework 402 to make a request, either a request/reply or publish/subscribe. The information associated with that request is put on an MQ/Series queue 404. There exists a listener 412, e.g., either a WebMethods or WebLogic, on the queue. This listener is a component of the OS390 EAI framework but exists in the distributed platform. The listener reads the queue, marshals the information, and then acts as a requestor to the existing EAI framework 410. A SCP 414 accesses the target resource 416, and the answer is returned to the original COBOL requestor 400 again using MQ/Series 404.

The COBOL EAI framework 402 is the EAI component that the COBOL application engages to make a request and get back an answer or acknowledgement. This component accesses an EAI directory to acquire the information necessary to accomplish the task [e.g. name of queue]. Additionally, this component provides a service to retrieve the response. Because of the complexity of some of the distributed services, it is often the case that the response cannot be mapped into a COBOL Copybook (e.g. the COBOL description of a block of data). As a consequence, the COBOL EAI service provides a field-level result service. That is to say data may be returned in 'chunks' that map to various COBOL copybooks. This provides for the ability of the COBOL program to consume complex information that was originally hierarchical in nature (such as XML). Consuming the data in chunks is done locally from the requestor's point of view, minimizing network trips.

It will thus be seen that the invention efficiently addresses the needs noted above. Since certain changes may be made in the above constructions without departing from the scope of the invention, it is intended that all matter contained in the above description or shown in the accompanying drawings be interpreted as illustrative and not in a limiting sense.

What is claimed is:

1. A system for integrating a plurality of computer applications, comprising:
   on a platform with a requestor,
   an abstraction layer operative to receive from the requestor a request of a target application, the request including data identifying a target application and a target application service requested by the requestor;
   a plurality of sack content providers in communication with the abstraction layer, the plurality of sack content providers operative to interface with a plurality of elements including at least a first application and at least a first hub; and
   a Profile Manager in communication with the abstraction layer, the Profile Manager operative to receive data identifying a target application and to select which of the plurality of sack content providers to use to interface with the appropriate element based on the data identifying the target application.

2. The system of claim 1, wherein the plurality of Sack content providers includes a first sack content provider operative to interface with a first application, a second sack content provider operative to interface with a second application and a third sack content provider operative to interface with a hub.

3. The system of claim 1, wherein the abstraction layer comprises:
   a Request Manager for receiving from a requestor a request of a target application, the request including data identifying a target application and a target application service requested by the requestor; and
   a Sack Manager in communication with the Request Manager and in communication with the sack content provider, the Sack Manager operative to create a sack and to receive sack content from the sack content provider.

4. The system of claim 1, wherein the Profile Manager is operative to determine a method for the requestor to access the target application and the method is selected from the group of methods consisting of RPC, Point-to-Point (P2P) messaging, Publish-and-Subscribe and Extract-Transform-Load (ETL).

5. The system of claim 1, wherein the Profile Manager is implemented using a lightweight directory access protocol.

6. A method for integrating a plurality of computer applications, comprising:
   receiving from a requestor a request of a target application, the request including data identifying a target application and a target application service requested by the requester, the request being received at an abstraction layer; and
   using a Profile Manager in communication with the abstraction layer to receive data identifying the target application, to select a sack and to select which of a plurality of sack content providers to use to interface with an appropriate element given the target application, the plurality of sack content providers in communication with the abstraction layer, the plurality of sack content providers operative to interface with a plurality of elements including at least a first application and at least a first hub.

7. The method of claim 6, wherein the abstraction layer and the Profile Manager are on the same platform as the requestor.

8. The method of claim 6, wherein the method further comprises:
   returning the selected sack to the requestor for populating by the requestor with data necessary for the requested service; and
   forwarding the populated sack with the request to the selected sack content provider to allow the sack content provider to attempt to satisfy the request.

9. The method of claim 6, wherein receiving a request comprises:
   receiving the request at a Request Manager; and wherein the method further comprises:
   providing a Sack Manager in communication with the Request Manager and with at least one of the sack content providers; and
   using the Sack Manager to create a sack and to receive sack content from the sack content provider.

10. The method of claim 6, wherein the request does not include target location information.

11. The method of claim 6, wherein the request does not include target technology information.

12. A system for integrating a plurality of computer resources, comprising:
- an abstraction layer operative to receive from a requester a request of a target resource, the request including data identifying a target resource and a target resource service requested by the requester;
- a plurality of sack content providers in communication with the abstraction layer, the plurality of sack content providers operative to interface with a plurality of elements including at least a first resource and at least a first hub; and
- a Profile Manager in communication with the abstraction layer, the Profile Manager operative to receive data identifying a target resource and to select which of the plurality of sack content providers to use to interface with the appropriate element based on the data identifying the target resource.

13. The system of claim 12, wherein the plurality of SCPs sack content providers includes a first sack content provider operative to interface with a first resource, a second sack content provider operative to interface with a second resource and a third sack content provider operative to interface with a hub.

14. The system of claim 13, wherein the target resource is a target application.

15. The system of claim 12, wherein the system runs on the same platform with the requester.

16. The system of claim 12, wherein the abstraction layer comprises:
- a Request Manager for receiving from a requestor a request of a target resource, the request including data identifying a target resource and a target resource service requested by the requestor; and
- a Sack Manager in communication with the Request Manager and in communication with the sack content provider, the Sack Manager operative to create a sack and to receive sack content from the sack content provider.

17. The system of claim 12, wherein the Profile Manager is operative to determine a method for the requestor to access the target resource and the method is selected from the group of methods consisting of RPC, Point-to-Point (P2P) messaging, Publish-and-Subscribe and Extract-Transform-Load (ETL).

18. The system of claim 12, wherein the Profile Manager is implemented using a lightweight directory access protocol.

* * * * *